(12) United States Patent
Hall

(10) Patent No.: US 8,105,442 B2
(45) Date of Patent: Jan. 31, 2012

(54) TUBULAR MEASUREMENT SYSTEM

(75) Inventor: Anthony D. Hall, Halifax (CA)

(73) Assignee: Welaptega Marine Limited, Halifax (CA)

( * ) Notice: Subject to any disclaimer, the term of this patent is extended or adjusted under 35 U.S.C. 154(b) by 525 days.

(21) Appl. No.: 12/394,287

(22) Filed: Feb. 27, 2009

(65) Prior Publication Data
US 2009/0217954 A1 Sep. 3, 2009

Related U.S. Application Data

(60) Provisional application No. 61/032,236, filed on Feb. 28, 2008.

(51) Int. Cl.
*B08B 3/00* (2006.01)
(52) U.S. Cl. ............. 134/115 R; 134/122 P; 134/166 R; 134/199; 15/93.1
(58) Field of Classification Search ................. None
See application file for complete search history.

(56) References Cited

U.S. PATENT DOCUMENTS 4,688,290 A * 8/1987 Hogg ........................ 15/104.04
2005/0206874 A1* 9/2005 Dougherty ................... 356/4.05

FOREIGN PATENT DOCUMENTS
EP 214841 A2 * 3/1987

* cited by examiner

*Primary Examiner* — Michael Kornakov
*Assistant Examiner* — Eric Golightly
(74) *Attorney, Agent, or Firm* — Buskop Law Group, PC; Wendy Buskop

(57) ABSTRACT

A tubular measurement system for in service cleaning, inspecting, and measuring of a tubular, comprising: a first and second housing portion connected using hinges operable by hydraulic actuators. At least one high pressure water jet unit and a marine growth plough is disposed on a cleaning end of the housing. At least one enclosable camera block containing at least one digital camera is disposed on an inspection end of the housing. A first set of roller assemblies is disposed on the cleaning end and a second set of roller assemblies is disposed on the inspection end. A communication conduit is used to transfer signals from the digital cameras to a remote location. A hydraulic conduit and a high pressure water conduit provide hydraulic fluid and high pressure water from the remote location. A tether is used to provide a variable tension from the remote location to the housing.

13 Claims, 7 Drawing Sheets

TUBULAR MEASUREMENT SYSTEM

CROSS REFERENCE TO RELATED APPLICATIONS

The present application claims priority to U.S. Provisional Patent Application Ser. No. 61/032,236 filed on Feb. 28, 2008, entitled "Tubular Measurement System" and is hereby incorporated in its entirety.

FIELD

The present embodiments generally relate to a tubular measurement system for in service cleaning, inspecting, and measuring of a tubular.

BACKGROUND

A need exists for a tubular measurement system that is capable of cleaning, inspecting, and measuring tubulars while the tubulars are in use, without interrupting use of the tubulars.

A further need exists for a tubular measurement system that is capable of continuous digital imaging, allowing tubulars to be cleaned and inspected continuously, on a real-time basis.

A need has existed for a method, other than a visual inspection, to monitor the condition of a fiber or wire rope mooring line while in-service.

The present embodiments meet these needs.

BRIEF DESCRIPTION OF THE DRAWINGS

The detailed description will be better understood in conjunction with the accompanying drawings as follows.

Figure 1:
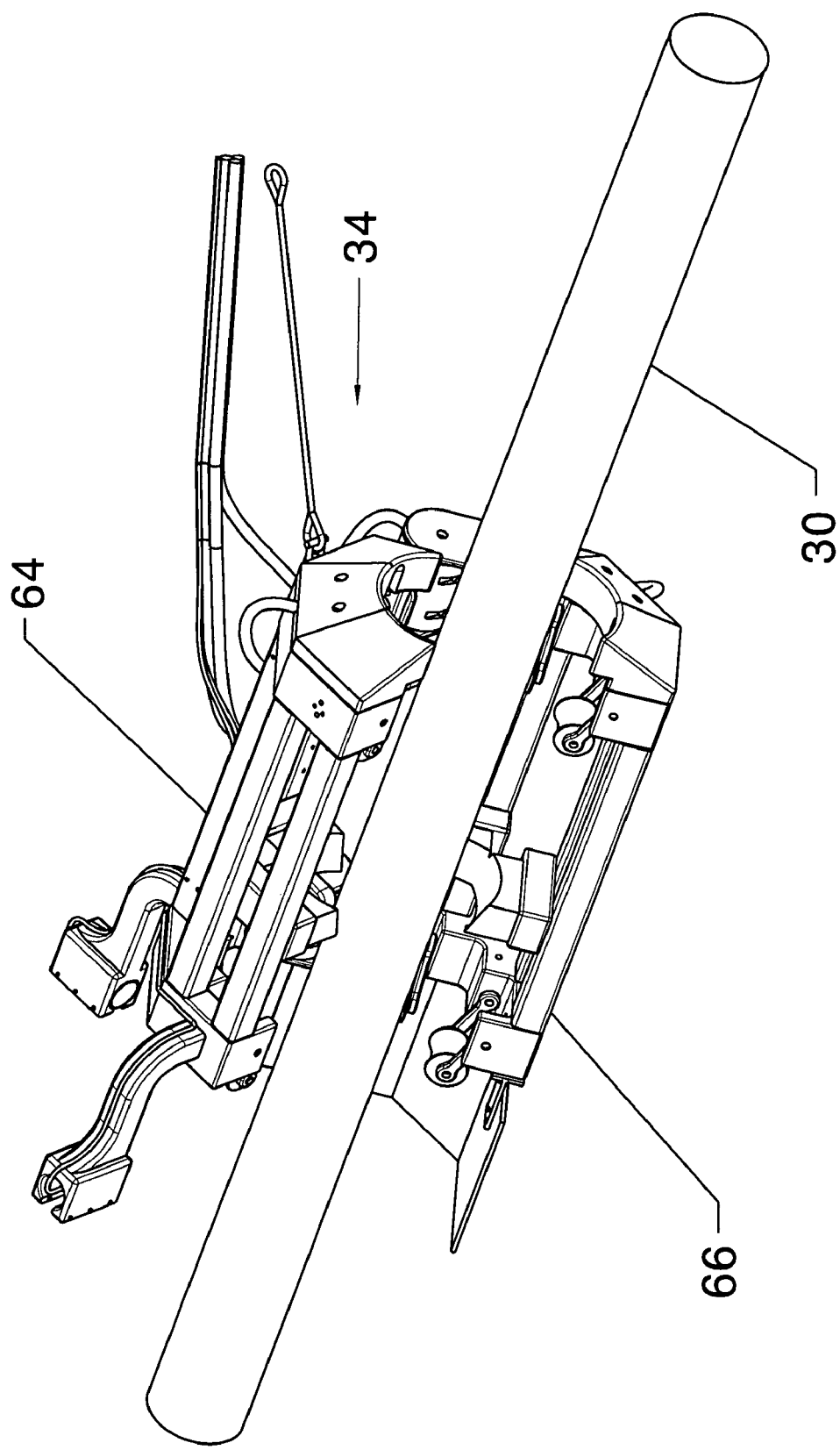
FIG. 1 shows the housing of the present tubular measurement system in an open position during deployment to a rope.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

Fiber and wire rope are the principle components of mooring systems on deep water installations. At present, operators are required to periodically remove sacrificial inserts of fiber rope and replace them with new rope. Analysis of removed sections determines the localized condition of the rope but does not provide an accurate picture of the overall condition of the mooring line. The present embodiments were designed to provide an accurate, "real time" picture of the mooring line, while the mooring line is in operation, without the need for a human or remotely operated vehicle (ROV), to actually inspect the line.

Conventionally, there are no existing systems or methods, other than visual inspection, to continuously monitor the condition of a tubular, such as a fiber or wire rope mooring line, during use.

The present system can enable in service cleaning, inspection, and measuring of a wide variety of tubulars, including wire robes, cables, fiber optic lengths, casings, risers, control umbilicals, and similar tubulars, while the measured tubulars are in use, without interrupting use of the tubulars.

Additionally, conventional visual inspection is limited in its accuracy, providing only a subjective determination of the condition of a small area of a tubular. Operators are required to remove pieces of rope or other tubulars and replace them with new material, and the removed pieces are then analyzed to determine the localized condition of the tubular.

The present system can be useable to assess the overall condition of tubulars, while the tubulars are in use, which can be done by moving a closable housing, which can further have a digital cameras along a tubular and can identify changes in cross-sectional geometry of the tubular. The system can simultaneously clean the surface of the tubular and records geometrical dimensions for later comparisons with manufacturer specifications.

Additionally, the present system can save human lives, because humans are no longer needed to visually inspect ropes or moorings in deep water.

Conventional methods enable only periodic assessment of a rope or tubular through analysis of removed portions. The present system is capable of continuous monitoring and inspection of tubulars, enabling one or multiple tubulars to be monitored remotely. Multiple tubulars can be monitored simultaneously, enabling the present system to inspect any number of facilities at one time.

There has existed a need for a device that can be deployed by a remote operating vehicle "ROV" to identify changes in the cross sectional geometry of a rope or other type of tubular. Changes in these measurements can indicate potential deterioration of the rope, which can indicate a failure in a mooring system, which can further cause a moored subsea structure to drift.

The present system can include a closable housing, which can be moved along a section of in-situ fiber or wire rope, cleaning the surface and recording geometrical dimensions for comparison with manufacturer's specifications. The closable housing can be a frame, such as a RMS frame.

The closable housing can have a first housing portion hinged to a second housing portion, and can be maintained in an open position during deployment to the rope, cable or other tubular.

The hinges can be contemplated to be operable by one or more hydraulic actuators, such as Helac L10 Series actuators.

At least one hydraulic actuator and up to about four hydraulic actuators can be used to operate the hinges. A preventer can be provided to prevent pinching when putting the tool on the rope The closable housing can be in an open position, wherein the rope can be a tubular such as a casing. The rope or tubular can have a tubular perimeter. The closable housing can have a first housing portion and a second housing portion, which can be connected together in a hinged arrangement using hydraulic actuators.

A remote operated vehicle "ROV" can deploy the closable housing to the fiber, wire rope, fiber optic length, casing, pipe, control umbilical, riser, or other tubular.

The closable housing can have a length ranging from about 1 foot to about 12 feet and a width ranging from about 1 foot to about 4 feet. The closable housing can be contemplated to have a central opening for accommodating a tubular having an outer diameter ranging from about ¼ of a foot to about 12 feet.

Each portion of the closable housing can be made from aluminum, stainless steel, carbon steel, an acetal copolymer, such as Delrin™, or other similar durable materials. The first and second housing portions can be contemplated to have substantially similar dimensions, however in an embodiment, one housing portion can have a larger or a smaller dimension than the other housing portion.

The closable housing can have a coating, such as paint or powder for resisting corrosion, physical wear, and/or damage caused by exposure to inclement weather and marine environments.

The hinges can include any type of hinge, such as barrel hinges, operable by one or more hydraulic actuators. At one hinge to up to about four hinges can be used to connect the first housing portion to the second housing portion. The hinges can be made from the same material as the housing, or from different materials.

In an embodiment, the present system can include a hinge coupling have a channel for receiving a removable hinge rod, such as a pin, for locking the hinges in a closed position.

At least one high pressure water jet unit, such as Karcher™ Water Jet Unit, having one or more nozzles, can be disposed on a cleaning end of the closable housing. The nozzles can be positioned to impact the tubular perimeter for cleaning the tubular. The present system can include from at least one to up to about four high pressure water jet units.

A marine growth plough can be also disposed on the cleaning end, for engaging the tubular perimeter. The marine growth plough can be made from an acetal copolymer or another similar material and can range from about 20 centimeters to about 40 centimeters in length and about 20 centimeters to about 40 centimeters in width. The marine growth plough can be contemplated to work in conjunction with the high pressure water jet units and one or more brushes to remove marine growth from a tubular.

In an embodiment, the present system can include a plurality of integrated brushes, which can be a heavy duty bristle brush with a concave shape, for cleaning the tubular after applying high pressure water from the high pressure integrated jet units, prior to inspecting the tubular with the digital cameras.

The marine growth plough, one or more of the high pressure water jet units, one or more brushes, or combinations thereof can be contemplated to be removable for providing customized types of cleaning to a tubular.

At least one hydraulic actuator can cause the first and second portions of the housing to close around the rope, cable or other tubular, and clasp shut. The rope can be centralized in the closable housing using at least 4 roller assemblies and up to 8 roller assemblies. As the frame is towed along the rope by the ROV using a tether, or pulled from the surface with a vessel, the closable housing removes marine growth using a marine growth plough, high pressure water jet units and an annulus of brushes. It can further be contemplated that in an embodiments, no brushes are used.

At least one enclosable camera block containing one or more digital cameras, such as marinized digital cameras, can be disposed on an inspection end of the closable housing. The inspection end can be contemplated to be located opposite the cleaning end of the closeable housing.

The enclosable camera blocks can range in size from about 50 millimeters to about 150 millimeters in length, about 50 millimeters to about 150 millimeters in width, and about 50 millimeters to about 200 millimeters in thickness. The enclosable camera blocks can be made from an acetal copolymer or another similar material. The present system can include from one enclosable camera block to four enclosable camera blocks. Each enclosable camera block can contain from one digital camera to four digital cameras.

In an embodiment, the present system can include a removeable camera arm, which can be disposed between the closable housing and the enclosable camera block. The camera arm can be useable for extending the digital cameras away from the tubular, such as when cleaning and inspecting a large diameter tubular that requires more distance between the cameras and the tubular for inspection of the tubular.

The removable camera arm can be made from an acetal copolymer, aluminum, or another similar durable material. The removable camera arm can have a length ranging from about 20 centimeters to about 400 centimeters and a diameter ranging from about 25 centimeters to about 100 centimeters.

In an embodiment, two digital cameras can be positioned at about a 90 degree angle in relation to each other, and at about a 90 degree angle in relation to the longitudinal axis of the tubular. It can be contemplated that as the closable housing is moved along the tubular, the two cameras can record two cross-sectional measurements at about a 90 degree angle to one another.

It can be contemplated that at least four enclosable camera blocks can be used, each positioned at about a 90 degree angle in relation to one another around the tubular, and positioned at about a 90 degree angle in relation to the longitudinal axis of the tubular.

The enclosable camera blocks can use video cameras to record simultaneous cross-sectional measurements at about a 90 degree angle to each other. The video cameras can transmit a signal via a ROV to a top side computer suite, which can include a processor, which can have computer instructions for instructing the processor to process the signals from the cameras at about 50 frames per second, in real time, while simultaneously applying a mathematical model for continuous measurement of the tubular, creating a geometric tubular profile.

Computer instructions can instruct the processor to compare the geometric tubular profile to a database of manufacturer's geometric tubular profiles in data storage associated with the processor, enabling real time determination of deviations in the tubular.

The present system can further include one or more indicators, such as alarms, flashing lights, other audio or visual signals, a report, or combinations thereof, for indicating when a deviation occurs between the created geometric profile for the tubular and the manufacturer's geometric tubular profiles from the database. The alarm can be triggered when a deviation exceeds a preset limit.

An imaging target plate can be disposed opposite the enclosable camera blocks for enabling continuous digital imaging of the tubular as the closable housing can engage and roll along the tubular. The imaging target plate can be contemplated to be about 60 centimeters by about 6.35 centimeters by about 28 centimeters with two longitudinal 45 degree bends.

In an embodiment, an integrated light emitting diode "LED" can be in each enclosable camera block, which can illuminate the tubular adjacent each camera against the imaging target plate. These LEDs can allow a tubular to be measured during conditions where ambient light is low.

A first set of roller assemblies can be disposed on the cleaning end of the closable housing, which can engage the tubular perimeter.

A second set of roller assemblies can be disposed on the inspection end, which can also engage the tubular perimeter.

In an embodiment, each roller assembly can include a roller, which can be made from acetal copolymer or a similar material, for rolling along a roller shaft, which can be made from stainless steel.

The roller shaft can be contemplated to engage a left control arm and a right control arm. Each control arm can engage a suspension shaft which can be secured to the closable housing. The control arms can be contemplated to be about 10 centimeters long by about 2 centimeters wide by about 1 centimeter thick.

In an embodiment, the first set of roller assemblies, the second set of roller assemblies, or combinations thereof, can include at least four roller assemblies. Each roller assembly can be disposed about 45 degrees from another roller assembly around the tubular perimeter, enabling the closable housing to roll against the tubular while maintaining a secure contact with the roller assembly. The rollers can be contemplated to centralize the tubular within the closable housing.

The present system can also include a communication conduit, which can be an electronic cabling, a fiber optics cable, a co-axial cable, or combinations thereof, which can be used to transfer signals from the digital cameras to a remote location.

The video signal can be contemplated to be transmitted via the ROV to a top side computer suite, which can process video signals at no less then about 50 frames per second in real time. Automatic measurement algorithms can measure the rope or other tubular at about 50 mm increments to determine the cross sectional geometry. This repeated sequence of small measurements can build a profile of the rope's geometry over the entire mooring spread. The profile can enable the owner to determine where and when a cable, rope, or another tubular should be replaced.

For fiber rope, potential deterioration is indicated if the diameter measurements are smaller than manufacturer's specifications. If measurements are greater than the manufacturer's specifications, this indicates a flattening in the rope's circumference, which is another sign of internal structural deterioration. For wire rope, an increase in diameter can be an indication of corrosion of interior wire strands.

Remote locations can include any location, such as a topside computer suite, located within or proximate to a facility moored using one or more tubulars that are inspected using the present system. Remote locations can also be in communication with the present system using one or more networks, allowing the present system to be monitored from any location worldwide.

The present system can further include a hydraulic conduit, such as a flexible hydraulic hose, for providing hydraulic fluid from the remote location to the hydraulic actuators.

The present system can further include a high pressure water conduit, such as a flexible hydraulic hose, for providing high pressure water from the remote location to the high pressure water jet units.

A tether, which can be made from stainless steel or another similar material, can be used to provide a variable tension from the remote location to the closable housing, enabling the closable housing to connect to a tubular and roll along the tubular. The tether can have a length ranging from about ½ meter to about 4 meters and a diameter ranging from about ½ centimeter to about 2 centimeters.

In an embodiment, each housing portion can include one or more struts disposed between the cleaning end and the inspection end. The struts can be made from an acetal copolymer or another similar material, and can have a length ranging from about ½ meter to about 2 meters, a width ranging from about 2 centimeters to about 8 centimeters, and a thickness ranging from about 2 centimeters to about 8 centimeters.

It can be contemplated that, in an embodiment, the present system can further include one or more processors located at the remote location. The processors can include computer instructions for performing real time computer image analysis, the results of which can be stored in data storage in communication with the processor.

A digital recording system can be in communication with the processor for receiving and storing results of the real time computer image analysis and digital images from the digital cameras.

In an embodiment, the system can be deployed using a work class ROV with a 7 function manipulator. The system components in this example can be contemplated to be a high resolution video camera array having up to about 4 cameras with integrated LED lighting to illuminate the tubular against the background which can be connected to the system. The closable housing can further be made from an actual based polymer.

The signals from the cameras can link at the surface to a digital recording system, which can have a wireless backup. A real time computer image analysis program can be used with a processor at the surface to determine the images of the tubular, or wire rope, in real time, simultaneously with the cleaning and inspection.

Turning now to the Figures, FIG. 1 depicts a closable housing 34 in an open position with a tubular 30 The closable housing 34 can have a first housing portion 64 and a second housing portion 66.

Figure 2:
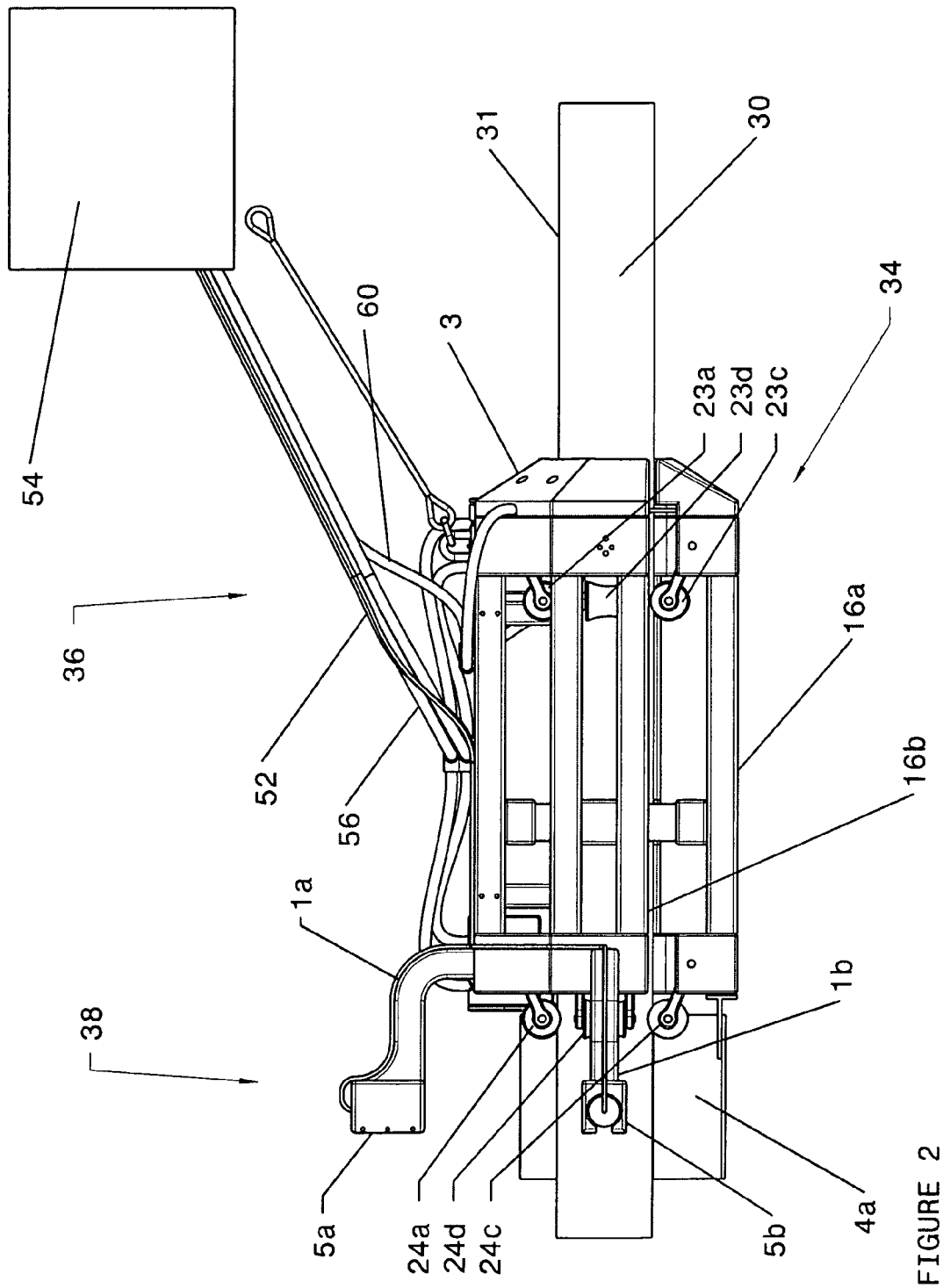
FIG. 2 is a side view of the closable housing of the present system.

FIG. 2 shows a side view of the closable housing 34, which can be removably locked down over the tubular 30. The closable housing 34 can have a plurality of struts 16a, 16b, which can be disposed between a cleaning end 36 and an inspection end 38 of the closable housing 34. The cleaning end 36 can have a marine growth plough 3.

The depicted system has four enclosable camera blocks, although only two are visible in FIG. 2, as elements 5a and 5b. Each of the enclosable camera blocks 5a, 5b can be connected to a camera arm 1a, 1b, which can be secured to the housing portions at about a 45 degree angle relative to one another around the tubular perimeter 31 of the tubular 30.

The enclosable camera blocks 5a, 5b, shown with camera arms 1a, 1b, can form the inspection end 38 of the closable housing 34. Opposite each enclosable camera block 5a, 5b, on the opposite side of the tubular 30 can be an imaging target plate 4a. In an embodiment, it can be contemplated that one imaging plate per enclosable camera block can be used, although only one imaging target plate 4a is visible in FIG. 2. Furthermore, the camera arms 1a, 1b can be removable.

A plurality of roller assemblies can be disposed around the tubular 30 on the inspection end 38 and on the cleaning end 36. Around the cleaning end 36 of the closable housing 34 can be a first set of roller assemblies 23a, 23c, 23d, and around the inspection end 38 can be a second set of roller assemblies 24a, 24c, 24d. In this embodiment, the roller assemblies per end can be contemplated to be equidistantly disposed around the tubular perimeter 31.

A communication conduit 52, which can contain a wire or fiber optics for conveying a signal to and from a remote location 54 to the cameras and other electronics, is shown on the closable housing 34.

A hydraulic conduit 56 can communicate to and from the remote location 54, which can further be contemplated to have a hydraulic source for providing hydraulic fluid to at least one hydraulic actuator of the present system.

A high pressure water conduit 60 can convey high pressure water from the remote location 54 to at least one high pressure water jet unit having at least one nozzle oriented at the tubular 30 at the cleaning end 36, which will be described in more detail in later Figures.

Figure 3:
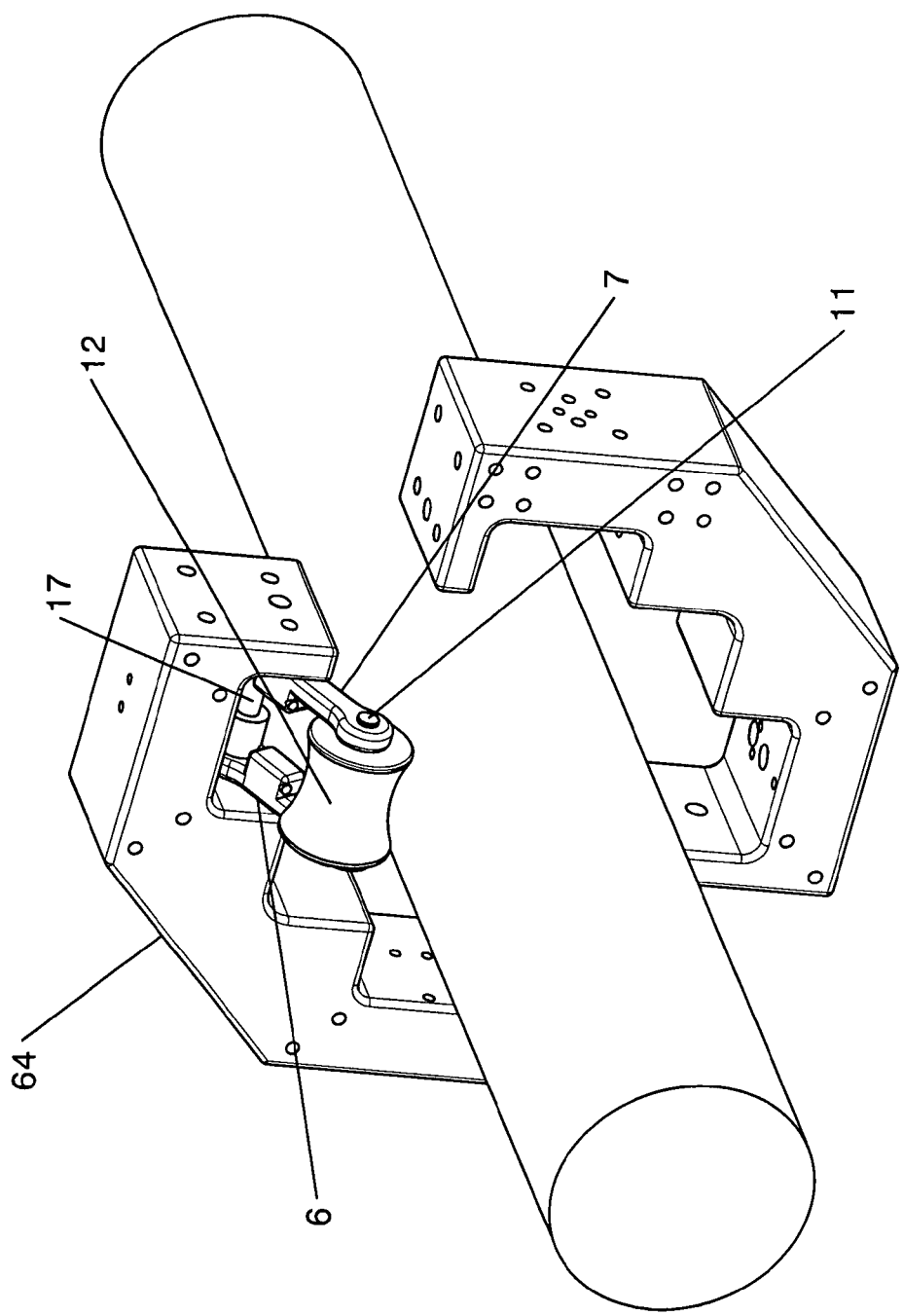
FIG. 3 shows a detailed view of one of the roller assemblies used to roll the closable housing.

FIG. 3 shows a detailed view of one of the roller assemblies used to roll the closable housing with the rope or other tubular. In this FIG. 3, the roller 12 can be disposed around a roller shaft 11. The roller shaft 11 can be supported on a left control arm 6 and a right control arm 7. The control arms 6, 7 can be connected on a suspension shaft 17. The suspension shaft can further engage the first housing portion 64.

Figure 4:
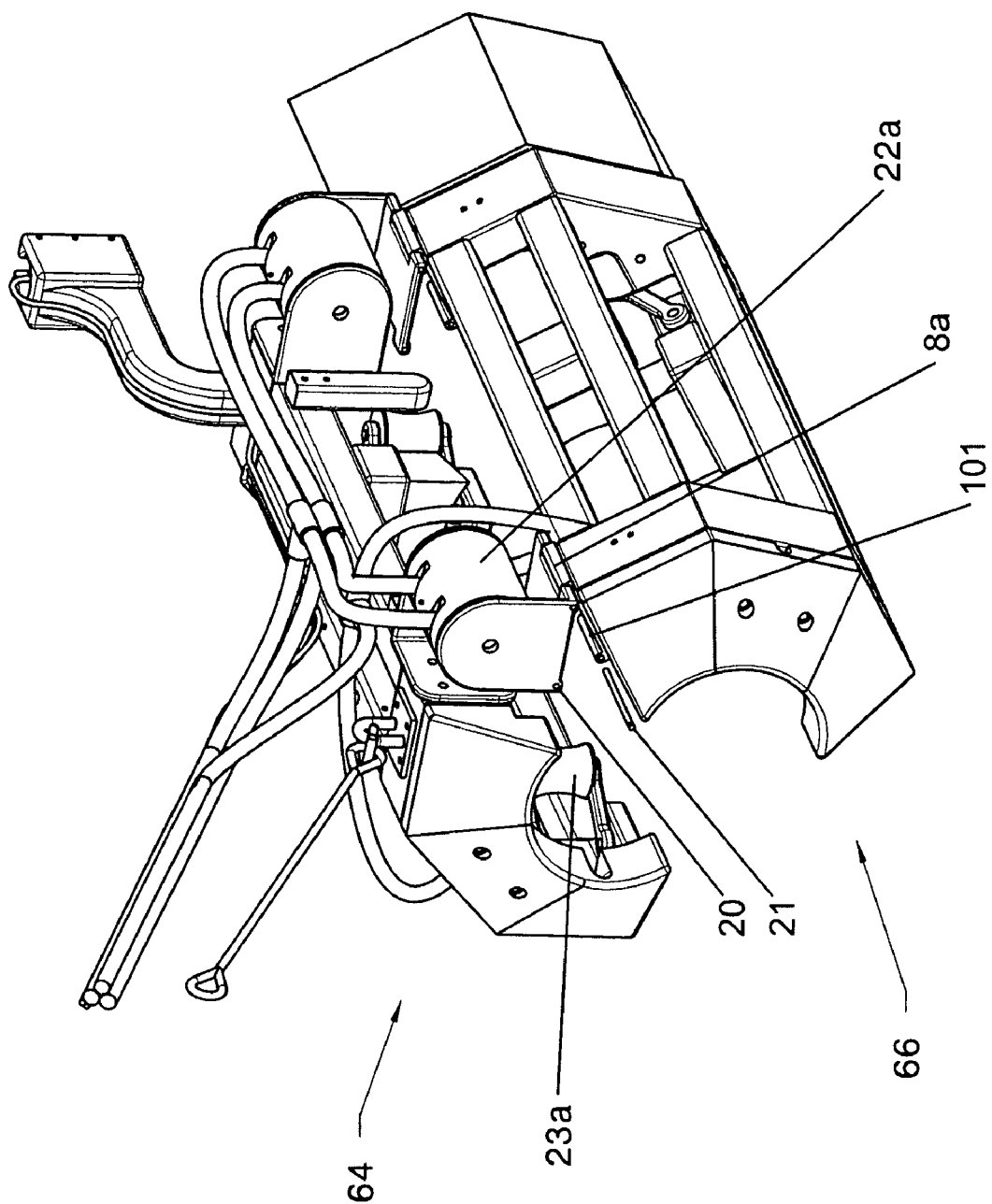
FIG. 4 shows the closable housing in an open or unhinged position.

FIG. 4 shows the closable housing in an open or unhinged position. FIG. 4 depicts a hydraulic actuator 22a, which can be connected to the first housing portion 64, which can further be connected by a hinge 8a to the second housing portion 66. Around the inner diameter of the housing portions the rollers of the first set of roller assemblies 23a can be seen.

FIG. 4 shows the closable housing 34 in an open or unhinged position. FIG. 4 further shows a hydraulic actuator 22a connected to the first housing portion 64, which can be connected by a hinge 8a to the second housing portion 66. Around the inner diameter of the housing portions can be seen the rollers of the first set of roller assemblies 23a.

In FIG. 4, it can be seen that a channel 20 can be drilled in a portion of the hydraulic actuator 22a, and an extension 101 can be disposed opposite the channel 20 to form a hinge locking mechanism, through which a removable hinge rod 21, such as a pin, can be disposed to lock the hydraulic actuator 22a in a closed positions around the tubular.

Figure 5:
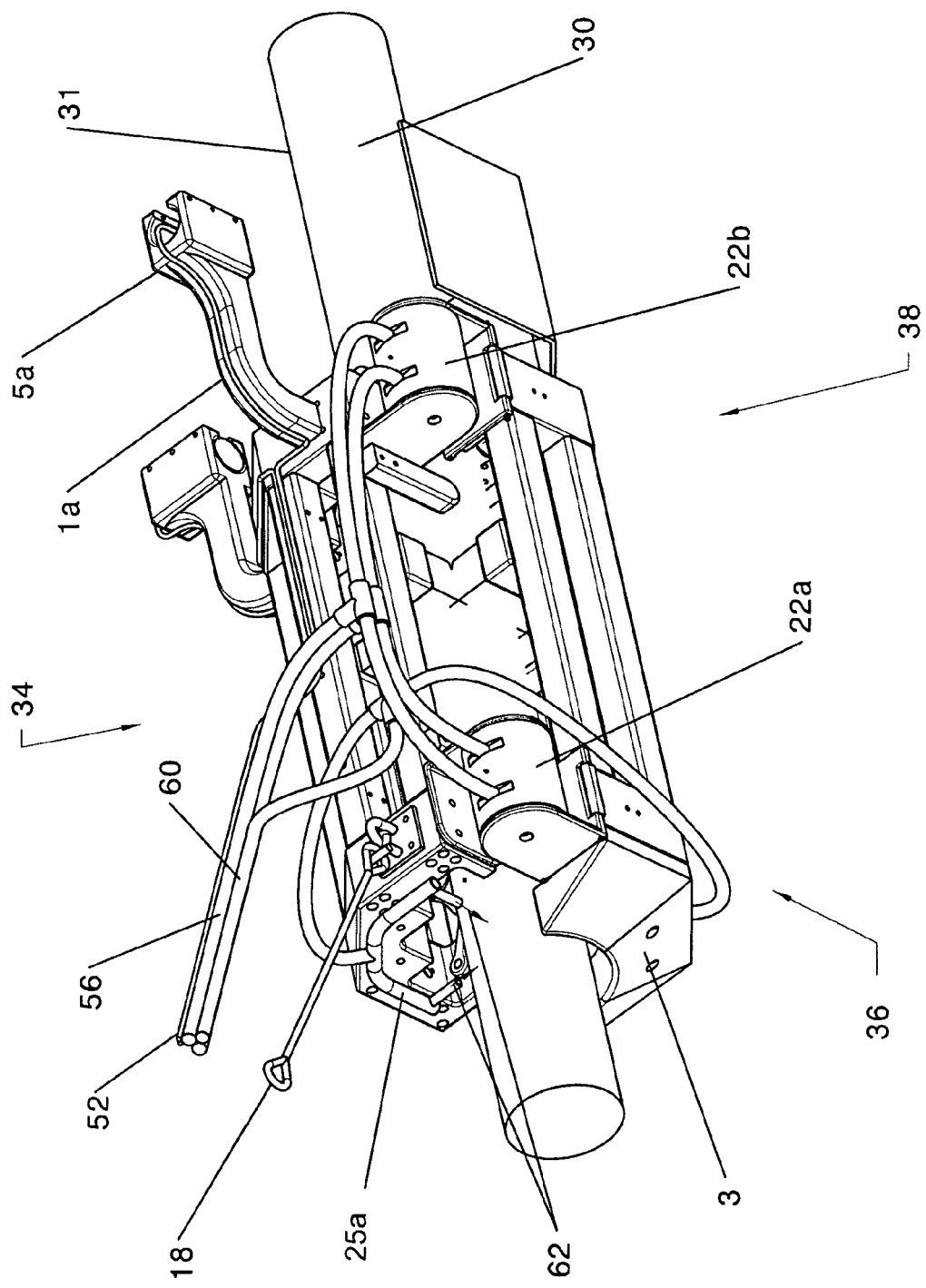
FIG. 5 shows the closable housing locked around the perimeter of a tubular.

FIG. 5 shows the closable housing 34 locked around the tubular perimeter 31 of a tubular 30, which FIG. 5 depicts as casing for subsea drilling rigs. The closable housing 34 can be depicted having the cleaning end 36 and the inspection end 38. The first hydraulic actuator 22a and the second hydraulic actuator 22b are also depicted.

A tether 18 for pulling of the closable housing 34 by an ROV is also shown. The tether 18 can be connected to an eye, which can be secured to the closable housing with an eyepad. The hydraulic conduit 56, the high pressure water conduit 60, and the communication conduit 52 are shown bundled together. One of the enclosable camera blocks 5a is shown engaged to camera arm 1a, which can be secured to the closable housing 34.

The high pressure water conduit 60, which can convey high pressure water 62 from at least one high pressure water jet unit 25a having at least one nozzle oriented at the tubular 30 at the cleaning end 36 is shown.

FIG. 5 further shows the marine growth plough 3 along with the high pressure water jet unit 25a, which is shown with two nozzles that can be secured to two different water pressure lines for cleaning marine growth from the tubular.

Figure 6:
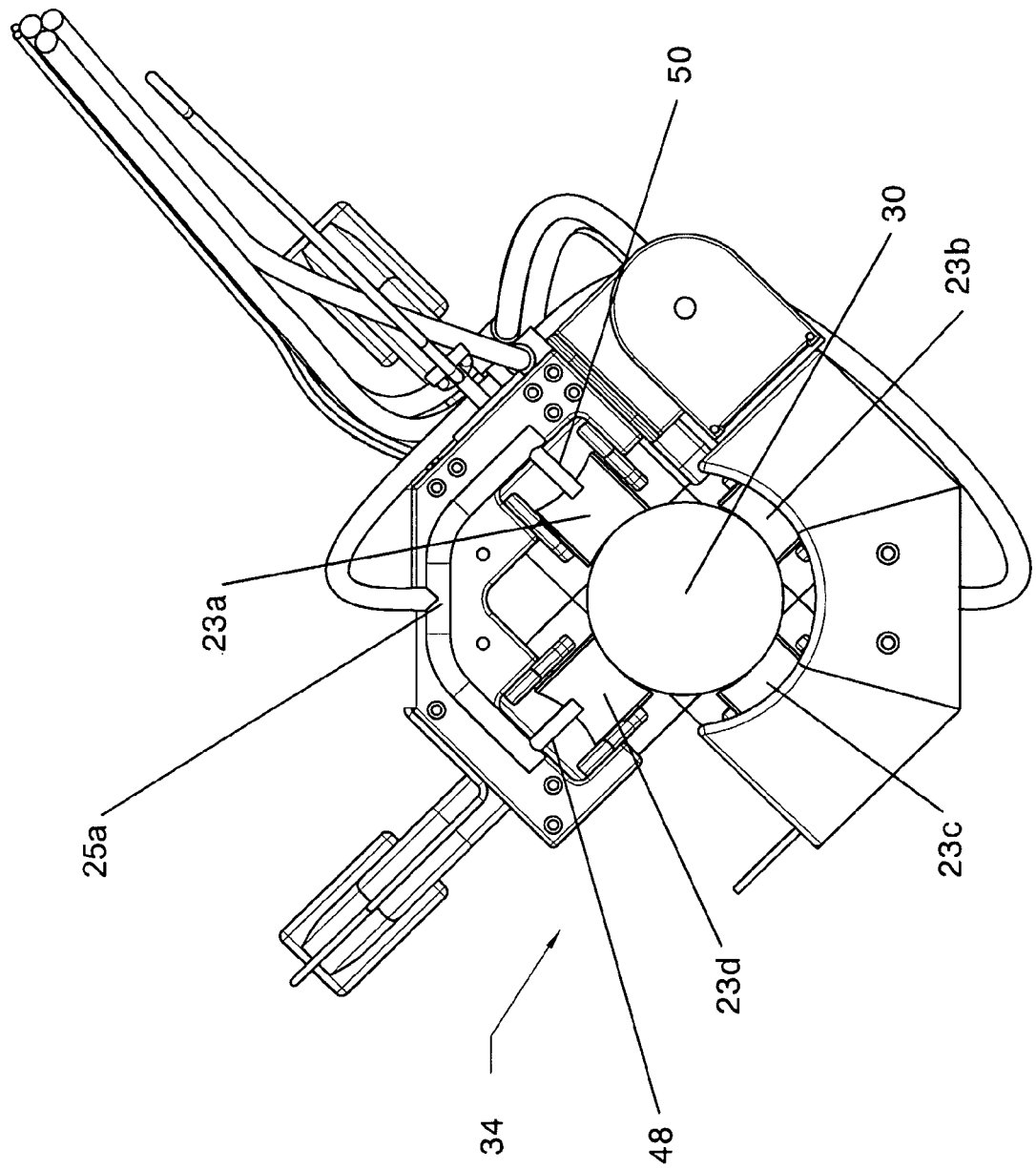
FIG. 6 depicts a detail of the closable housing with a first nozzle and a second nozzle for a high pressure water jet unit.

FIG. 6 depicts a detail of the closable housing 34 with a first nozzle 48 and a second nozzle 50, which can be connected to a high pressure water jet unit 25b. The tubular 30 is shown, in this embodiment, enclosed in the closable housing 34.

FIG. 6 further depicts the use of up to four first set of roller assemblies 23a, 23b, 23c, 23b.

Figure 7:
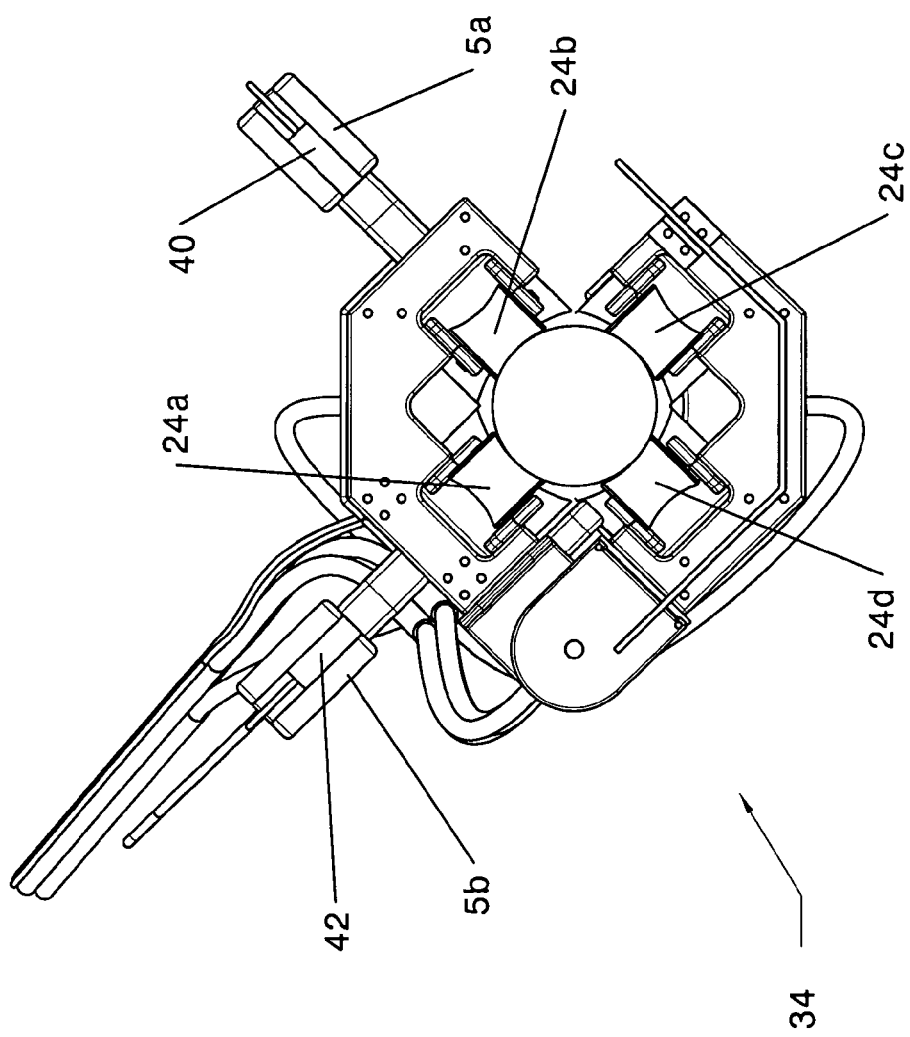
FIG. 7 shows a top view of an enclosable camera block with a first digital camera and a second digital camera enclosed therein.

FIG. 7 depicts the closable housing 34 and a top view of two enclosable camera blocks 5a, 5b. First enclosable camera block 5a is shown with a first digital camera 40 and second enclosable camera black 5b is shown with a second digital camera 42. The enclosable camera blocks can be openable and closable and can be contemplated to form a strong watertight seal, for preventing water from affecting the digital cameras.

FIG. 7 further depicts the use of up to four second set of roller assemblies 24a, 24b, 24c, 24d.

While these embodiments have been described with emphasis on the embodiments, it should be understood that within the scope of the appended claims, the embodiments might be practiced other than as specifically described herein.

What is claimed is:

1. A tubular measurement system for in service cleaning, inspecting, and measuring of a tubular having a tubular perimeter, wherein the tubular measurement system comprises:
   a. a first housing portion connected to a second housing portion using at least one hinge operable by at least one hydraulic actuator, forming a closable housing;
   b. at least one pressurized water jet unit with at least one nozzle disposed on a cleaning end of the closable housing, wherein the at least one nozzle is positioned to impact the tubular perimeter;
   c. a marine growth plough for engaging the tubular perimeter, wherein the marine growth plough is disposed on the cleaning end;
   d. four enclosable camera blocks, each camera block containing at least one digital camera disposed on an inspection end of the closable housing wherein each enclosable camera block includes a video camera, each enclosable camera block is positioned at 90 degrees relative to each other enclosable camera block and at 90 degrees relative to the longitudinal axis of the tubular, and the video cameras record two cross-sectional measurements of the tubular at 90 degrees to each other simultaneously;
   e. an imaging target plate disposed opposite the at least one enclosable camera block for enabling continuous digital imaging of the tubular as the closable housing engages and rolls along the tubular;
   f. a first set of roller assemblies disposed on the cleaning end for engaging the tubular perimeter;
   g. a second set of roller assemblies disposed on the inspection end for engaging the tubular perimeter;
   h. a communication conduit for transferring a plurality of signals from the at least one digital camera to a remote location;
   i. a hydraulic conduit for providing hydraulic fluid from the remote location to the at least one hydraulic actuator;
   j. a pressurized water conduit for providing high pressure water from the remote location to the at least one pressurized water jet unit;
   k. a tether for providing a variable tension from the remote location to the closable housing for enabling the closable housing to connect to the tubular and roll along the tubular providing cleaning, inspection, and measuring of the tubular while the tubular is in use without interrupting use of the tubular; l. a remote operated vehicle; and m. a top side computer suite comprising a processor and a computer-readable medium, the computer-readable medium including instructions recorded on the computer readable medium; wherein the video cameras transmit a signal via the remote operated vehicle to the top side computer suite and the instructions, when executed, instruct the processor to process video signals from the video camera at 50 frames per second in real time while simultaneously applying a mathematical model for continuous measurement of the tubular creating a geometric tubular profile.

2. The system of claim 1, further comprising a camera arm disposed between the closable housing and the at least one enclosable camera block.

3. The system of claim 1, wherein each housing portion comprises at least one strut disposed between the cleaning end and the inspection end.

4. The system of claim 1, further comprising a hinge coupling comprising a channel for receiving a removable hinge rod.

5. The system of claim 1, wherein the at least one hydraulic actuator comprises a preventer.

6. The system of claim 1, wherein the tubular is a wire rope, a cable, a fiber optic length, a casing, a riser, or a control umbilical.

7. The system of claim 1 wherein the first set of roller assemblies comprises at least four roller assemblies, and wherein each roller assembly is disposed 45 degrees from another roller assembly around the tubular perimeter, enabling the closable housing to roll against the tubular while maintaining a secure contact with each roller assembly.

8. The system of claim 1, wherein the second set of roller assemblies comprises at least four roller assemblies, and wherein each roller assembly is disposed 45 degrees from another roller assembly around the tubular perimeter, enabling the closable housing to roll against the tubular while maintaining a secure contact with the roller assembly.

9. The system of claim 1, wherein each roller assembly comprises a roller for rolling on a roller shaft, wherein the roller shaft engages a left control arm and a right control arm, and wherein the right and left control arms further engage a suspension shaft which is secured to the closable housing.

10. The system of claim 1, further comprising a database of a manufacturer's geometric tubular profiles in data storage associated with the processor and computer instructions for instructing the processor to compare the geometric tubular profile to the database of the manufacturer's geometric tubular profiles.

11. The system of claim 10, further comprising an indicator for providing an indication when a deviation occurs between the geometric tubular profile and the database of the manufacturer's geometric tubular profiles.

12. The system of claim 1, further comprising an integrated light emitting diode in the enclosable camera blocks for illuminating the tubular adjacent the at least one digital cameras against the imaging target plate.

13. The system of claim 1, further comprising a plurality of integrated brushes for cleaning the tubular after applying the pressurized water to the tubular and prior to inspecting the tubular.

\* \* \* \* \*